United States Patent
Marchant

(10) Patent No.: US 6,631,492 B2
(45) Date of Patent: Oct. 7, 2003

(54) MULTITRACK DATA RECORDING AND READ OUT OF RECORDED MULTITRACK DIGITAL DATA FOR ERROR CORRECTION

(75) Inventor: Alan B. Marchant, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 443 days.

(21) Appl. No.: 09/754,386

(22) Filed: Jan. 2, 2001

(65) Prior Publication Data

US 2002/0124225 A1 Sep. 5, 2002

(51) Int. Cl.$^7$ .......................... G11C 29/00; G06F 11/00
(52) U.S. Cl. ........................ 714/764; 714/800
(58) Field of Search ................ 714/764, 763, 714/769, 799, 800, 754, 758, 718, 702

(56) References Cited

U.S. PATENT DOCUMENTS

| | | | | |
|---|---|---|---|---|
| 4,719,628 A | * | 1/1988 | Ozaki et al. | 714/755 |
| 4,996,690 A | * | 2/1991 | George et al. | 714/781 |
| 5,487,077 A | * | 1/1996 | Hassner et al. | 714/762 |
| 5,841,794 A | | 11/1998 | Inoue et al. | 371/37.4 |

OTHER PUBLICATIONS

"Principles of Optical Disc Systems" by K. S. Immink, Section 7.2.2, pp. 247–254, Philips Research Laboratories, Eindhoven.

"Error–Correcting Codes", by W. Wesley Peterson et al., Second edition, Section 9.2 and 9.7, pp. 271–307.

\* cited by examiner

*Primary Examiner*—Christine T. Tu
(74) *Attorney, Agent, or Firm*—Raymond L. Owens

(57) ABSTRACT

An error correction method for multitrack data recording and read out of recorded multitrack digital data includes organizing input digital data into a sequence of data words and encoding each data word as a fixed-length transverse error correcting code word having a fixed number of symbols which represent digital data and parity.

8 Claims, 4 Drawing Sheets

(Prior Art)

(Prior Art)

MULTITRACK DATA RECORDING AND READ OUT OF RECORDED MULTITRACK DIGITAL DATA FOR ERROR CORRECTION

FIELD OF THE INVENTION

The present invention relates to error correction for multi-track digital data storage.

BACKGROUND OF THE INVENTION

The demand for increasing data storage capacity and data transfer rate motivates the design of linear-format digital data storage systems with more heads, narrower track pitch, higher media transport speed, and greater in-track data density. These trends can be seen particularly in the development of digital tape drives, including both optical tape drives and magnetic tape drives.

As data rate and data density are increased, the deleterious effects of media defects become more serious. For example, small imperfections in a recording medium such as a magnetic tape or an optical tape may not disturb the recording or readout of large data marks recorded at a low data density. But for higher density recording with smaller data marks the same imperfections may inhibit the recording of data marks or distort the readout signals. As another example, consider a tape recording medium that is undamaged by the transport mechanism in a low-speed linear tape drive. The same tape recording medium could be scratched in the transport of a high-speed, high capacity tape drive, resulting in the loss of one or more data tracks. What is needed is a method for digital error-correction that is suitable for multi-track linear data recording that efficiently corrects data errors due to scratches or media defects.

When the error rate is high, the overall reliability of a digital data storage system may be improved by a rewrite strategy. Newly recorded data is read to determine the relative number of digital errors. If the system Error Correction Code (ECC) cannot correct the observed error rate with adequate margin, the data is rewritten. The rewrite strategy will restrict the net data transfer rate unless the system can read the data immediately after it is written and measure the error rate without substantial delay. Therefore it is important that the error correction method provide high-speed error detection.

SUMMARY OF THE INVENTION

It is an object of this invention to provide an efficient and reliable error correction in a multi-track digital data recording system.

It is a further object of this invention to provide for error correction that reliably corrects errors caused by longitudinal scratches (oriented parallel to the data tracks and media transport direction) and other sorts of media defects.

It is a further object of this invention to support high-speed error detection and correction.

These objects are achieved by an error correction method for multitrack data recording and read out of recorded multitrack digital data, comprising the steps of:

a) organizing input digital data into a sequence of data words;

b) encoding each data word as a fixed-length transverse error correcting code word having a fixed number of symbols which represent digital data and parity;

c) recording each transverse error correcting code word onto a plurality of longitudinal data tracks on a recording medium with no more than two code symbols from each code word recorded on each track;

d) reading recorded transverse error correcting code words by a plurality of readout transducers, with at least one transducer for each data track, that reproduce the code word symbols of each transverse error correcting code word from the plurality of longitudinal data tracks; and e) processing the transverse error correcting code words to recover the data words and identify and correct symbol errors such as caused by media defects or transducer failures by using the error correcting parity.

ADVANTAGES

The present invention has as an advantage that data errors resulting from longitudinal scratches and recording head failures may be corrected efficiently with minimal ECC overhead. The method is compatible with multi-track linear recording at high data rates and high data density. The method also provides rapid measurement of digital errors to support re-write strategies.

It is a further advantage of the present invention that it may be integrated with a multi-level ECC system to provide reliable detection and correction of random errors and large defects that may occur along with media scratches and head failures. The method further provides for incorporation of timing synchronization patterns into the data tracks with no increase in overhead. The present invention is particularly effective when it records ECC code words in a linear format; that is, the tracks are parallel to the media motion.

DETAILED DESCRIPTION OF THE INVENTION

For most applications, systems for digital data storage must ensure essentially zero net error rate. This means that the data recovery process must identify and correct any errors caused by media defects, drive disturbances, or channel failures with an extremely high level of confidence. Error-Correcting Codes (ECC) are used to detect and correct such errors.

Figure 1:
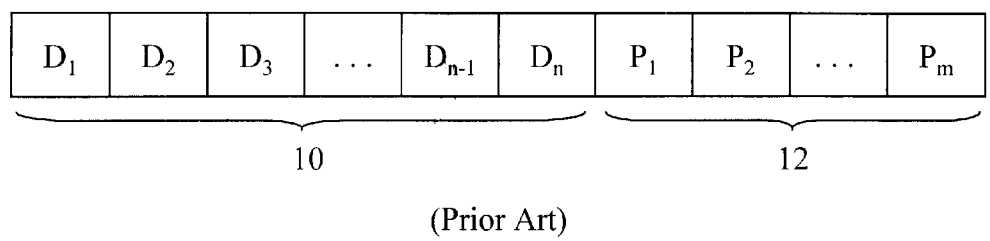
FIG. 1 illustrates the general form of an ECC code word (prior art)

ECC encoding according to the prior art is illustrated by FIG. 1. The ECC system operates on a data word that includes a number of bits of user information up to n×b bits. The ECC system converts the data word to a fixed-length ECC code word consisting of n+m code symbols of b bits each. The ECC code word represents n data symbols, 10, and m redundant parity symbols, 12. If a limited number of the code symbols develop errors in the course of data recording, storage, and readout, the ECC system is able to identify and correct the errors by comparison of the data symbols with the parity symbols.

A preferred class of ECC codes are the Reed Solomon (RS) codes. For an explanation of Reed-Solomon codes, see Error-Correcting Codes, Sections 9.2 and 9.7, W. W. Peterson and E. J. Weldon, Jr. Data recovery with an RS code can correct any combination of v random symbol errors and e symbol erasures provided that $n-m \geq 2v+e$. A symbol error is a b-bit symbol with any number (1 to b) of bits in error. A symbol erasure is a specific symbol that is known to include at least one faulty bit, although the correct value of the symbol is not known before processing of the ECC code word.

An important restriction of RS codes is that the ECC code word may be no longer than $2^b-1$ code symbols. For example, in the common case where b=1, the code symbols are bytes and the maximum ECC code word size is 255 bytes. Another characteristic of RS codes is that processing delays and implementation costs increase rapidly as the error correction capability increases. For this reason, the number of parity symbols in an RS code word is often constrained to $m \leq 20$, limiting the maximum error correction capability to 10 random symbol errors. In erasure-mode error correction (if the location of all errors is known á priori), the error correcting capability of such a code is 20 symbol errors.

Figure 2:
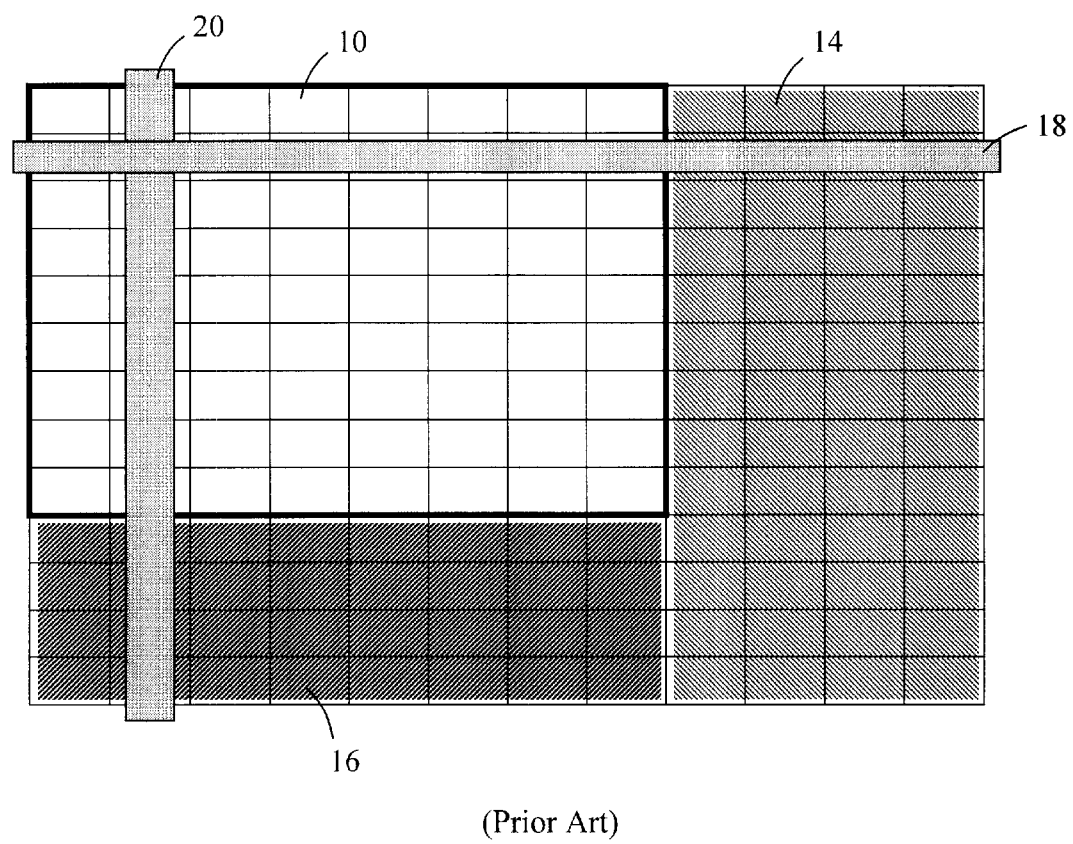
FIG. 2 shows the logical structure of a 2-dimensional product code according to the prior art.

The error correction capability of an ECC system may be greatly increased according to the prior art by providing two levels of ECC codes organized in a product code. FIG. 2 illustrates the logical structure of a product code. A block of data symbols, 10, is logically organized in a rectangular grid. Each of the data symbols is encoded into two ECC code words. First each column of data symbols is converted into an outer ECC code word, 20. Then each row of outer code word symbols (including the outer code parity symbols, 16) is converted into an inner ECC code word, 18, with the addition of inner code parity symbols, 14.

Processing of a product code ECC block for error correction proceeds as follows. Each of the inner code words are processed to correct errors. If the number of symbol errors in any inner code word exceeds the error correction capability of the inner code word, the symbol errors are not corrected. Or that row of the ECC block may be flagged for erasure correction. After processing of the inner code words, the outer code words are processed to correct residual errors. The residual errors consist of symbols from flagged inner code words that will be corrected by erasure correction and residual errors from undetected failures of the inner ECC decoder. If an excessive number of symbol errors is detected during processing of the outer code words, the system may return to the inner code words and repeat the process, taking advantage of the symbol corrections achieved in the first iteration. In this way, a product code ECC permits reliable detection and correction of data errors even when the density of symbol errors is very high and without excessive processing delays or cost.

As a final line of defense against data errors, a data recording system may implement selective data block rewrite. Under this strategy, the data is read immediately after it is written and if the error rate is found to approach or exceed the limits of ECC capability, the data (including at least an entire ECC code block) is rewritten. This strategy of data block rewrite is most effective if the ECC code words can be processed quickly to estimate the number of errors, so that the system can make an immediate rewrite decision before the next data block is recorded.

ECC overhead is defined as the ratio of parity symbols to data symbols. Because an ECC product code block includes two sets of parity symbols, the ECC overhead for a product code is generally greater than for a single-layer ECC data format.

Figure 3:
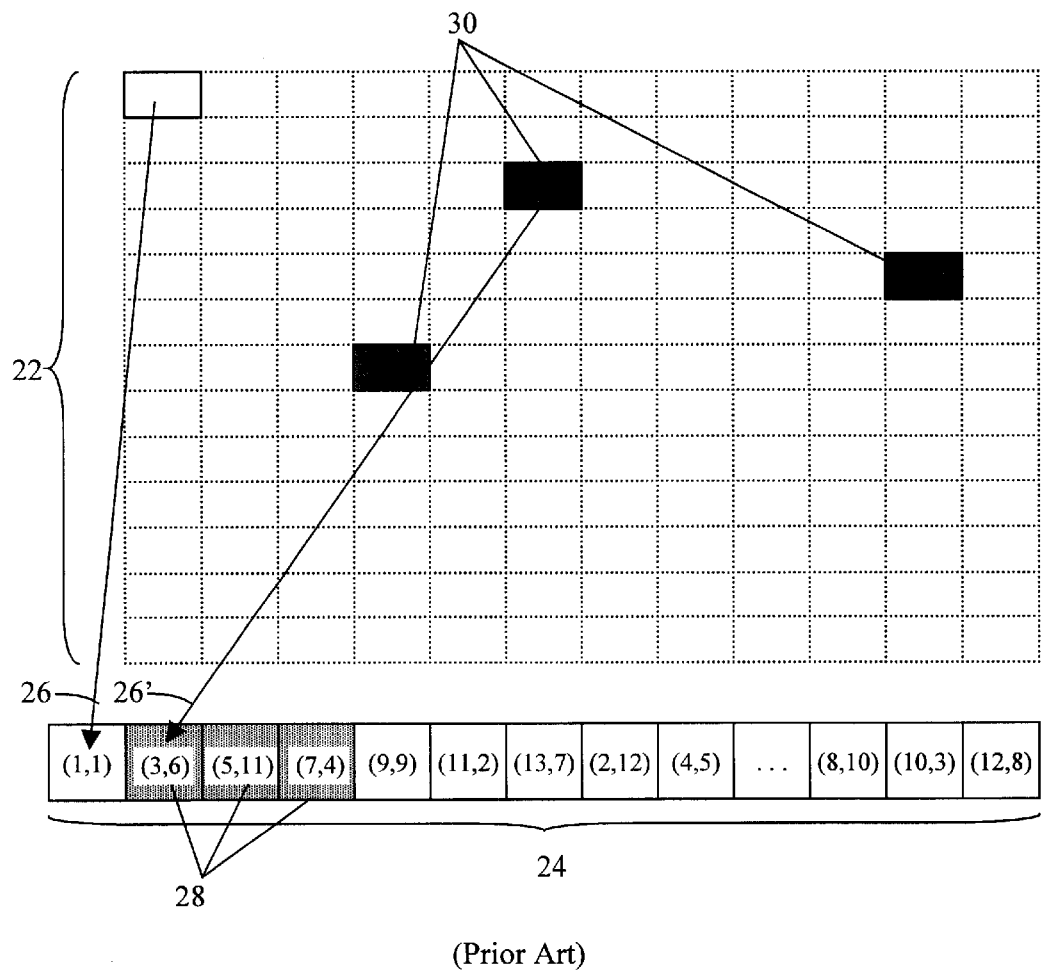
FIG. 3 illustrates interleaving of ECC code words (prior art)

The ECC performance of a data storage system may be further improved by interleaving ECC words to decrease susceptibility to error bursts. FIG. 3 illustrates interleaving of a product code ECC block according to the prior art. The symbols in a logical ECC block, 22, are transformed into a linear sequence of symbols on a data track, 24. One symbol in the logical ECC block is assigned to be the first symbol on the data track by a first data symbol mapping, 26. The second data symbol mapping, 26', selects the second symbol on the track by advancing a fixed number of rows and columns. In FIG. 3, the interleaving step consists of 2 rows and 5 columns. It is essential that the interleaving steps are not commensurate with the corresponding dimensions of the logical ECC block. The interleaving steps wrap around the interleaving block so that every symbol in the block is mapped to exactly one location on the sequential data track.

Interleaving of the ECC block has the effect of randomizing the locations of symbol errors. For example, in FIG. 3 a three-symbol error burst, 28, includes three defective symbols, 30, that belong to different inner and outer ECC code words (rows and columns). In an interleaved ECC block, large media defects that disturb the data for a long distance along the data track are much less likely to overwhelm the error correction capability of the ECC system. Further immunity to large defects or error bursts may be obtained by interleaving multiple ECC blocks together, so that the symbol errors from one error burst are spread over multiple ECC blocks.

An interleaved product code was first commercially implemented for optical recording (see Principles of Optical Disc Systems, Section 7.2.2, K. S. Immink) as a means for reliably detecting and correcting errors caused by a wide range of media defects. In the Compact Disc implementation, the two-dimensional ECC block is cross interleaved onto one data channel recorded continuously on a single spiral data track.

Figure 4:
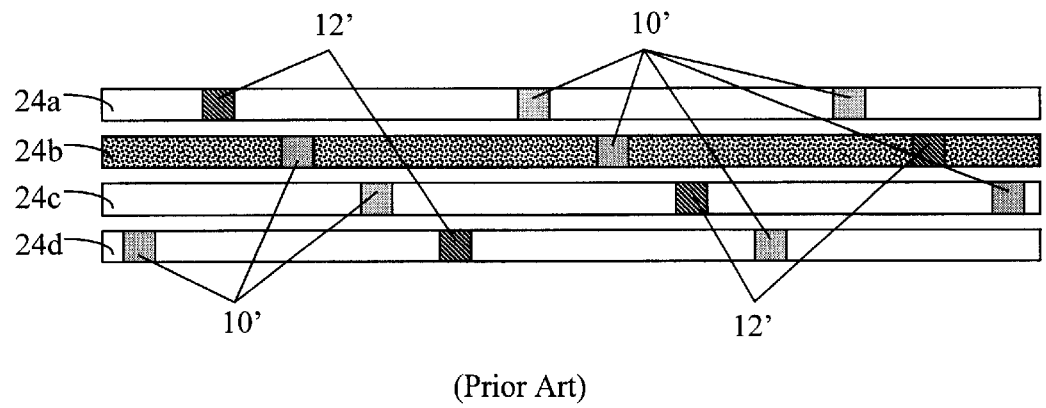
FIG. 4 shows an ECC code word distributed across multiple tracks according to the prior art.

To achieve increased data rates in data storage systems, it is desirable to record and read data simultaneously from multiple data tracks. Further advantages can be achieved by coordinating the ECC format with the disposition of data on multiple tracks. FIG. 4 shows an ECC code word recorded on multiple tracks according to the prior art. The ECC code word consists of data symbols, 10', and parity symbols, 12', that are recorded on multiple data tracks 24a–d with several code symbols disposed on each track. In the prior art, the code symbols are also dispersed widely along each (see U.S. Pat. No. 5,841,794.) A longitudinal media defect, such as a scratch that is oriented parallel to the data tracks, or a defective recording or readout transducer may create a defective data track, 24b, with many symbol errors over an extended length. In order to correct the effects of a defective track, the ECC code must have sufficient parity and error correcting capability to correct at least as many symbol errors as the size of the ECC code word divided by the number of data tracks. This ratio is the number of symbols from each code word that may be disposed on each track. The dispersal of ECC code word symbols along the length of the tracks does not change this requirement, because data track defects caused by longitudinal scratches or faulty transducers may extend much further than the length of the dispersed code word.

Figure 5:
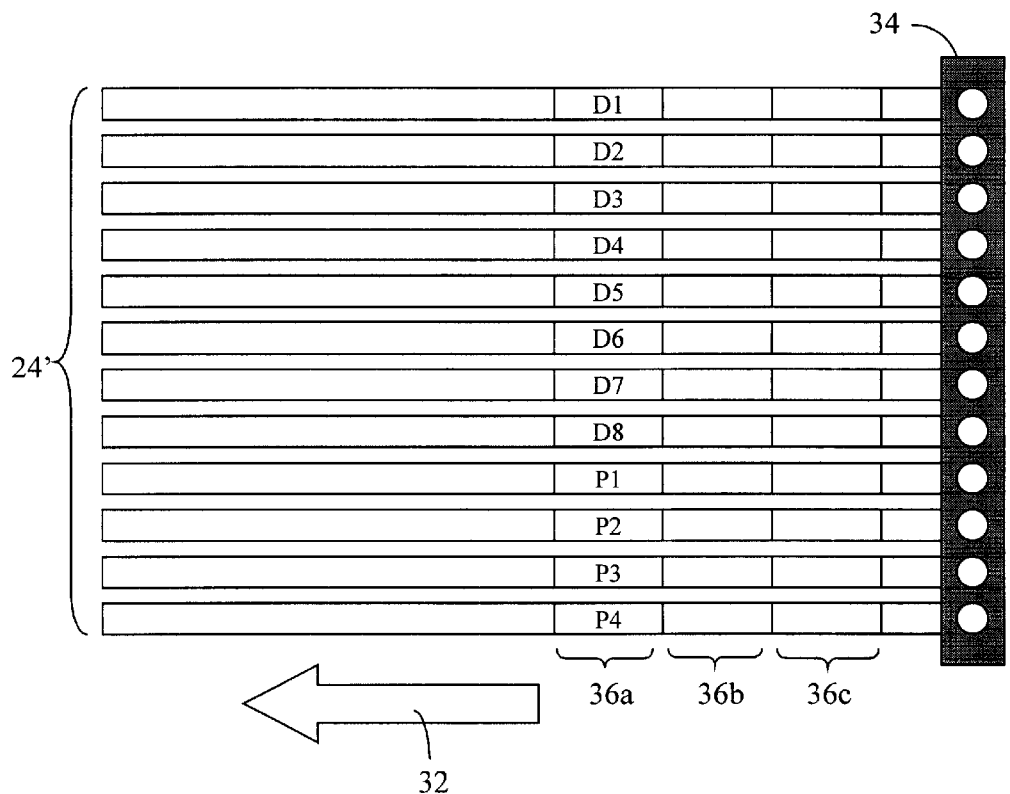
FIG. 5 illustrates readout of transverse ECC code words in a multi-track recording system according to the present invention.

FIG. 5 illustrates readout of transverse ECC code words in a multi-track linear recording system according to the present invention. As longitudinal data tracks 24' on a recording medium such as a magnetic tape or an optical tape are transported in a data scanning direction 32 that is parallel to the data tracks, a transducer array 34 including a plurality of readout transducers sequentially reproduces transverse ECC code words, 36a–c, that have been previously recorded on the data tracks. Each code word consists of data symbols and parity symbols, with no more than two symbols from each transverse ECC code word recorded on each data track. The number of readout transducers is equal to or greater than the number of data tracks on which the transverse ECC code words have been recorded, so that each code word is reproduced in a single scan, with no delay to rescan the medium or reposition the transducers onto other tracks.

The example of FIG. 5 shows transverse ECC code words with eight data symbols and 4 parity symbols, disposed with exactly one symbol on each of the data tracks read by eight transducer elements. It will be appreciated that the recorded symbols of a transverse ECC code word may be disposed on the medium in various ways. As illustrated in FIG. 5, they may be disposed parallel to the transducer elements so that all the symbols of each code word are reproduced simultaneously. Alternatively, the code word symbols may be dispersed in a longitudinal direction parallel to the data tracks. However, such dispersal should preferably be limited so that the delay in reading a complete ECC code word, which equals the time to scan all its symbols, is short enough to permit processing of the ECC code word for real-time input to the data block rewrite decision process.

It will further be appreciated that the data tracks on which the symbols of a transverse ECC code word are recorded may be disposed on the medium in various ways. The code word may be recorded on a band of adjacent data tracks, as in the example of FIG. 5. Alternatively, the band of data tracks on which a transverse ECC code word is recorded may interleaved in the cross track direction with one or more other bands of data tracks. In this case, the cross-track spacing between transducer elements is greater than the track pitch, or spacing between adjacent tracks. Furthermore, the data band may consist of two or more sets of adjacent data tracks, with a correspondingly grouped arrangement of readout transducer elements.

Figure 6:
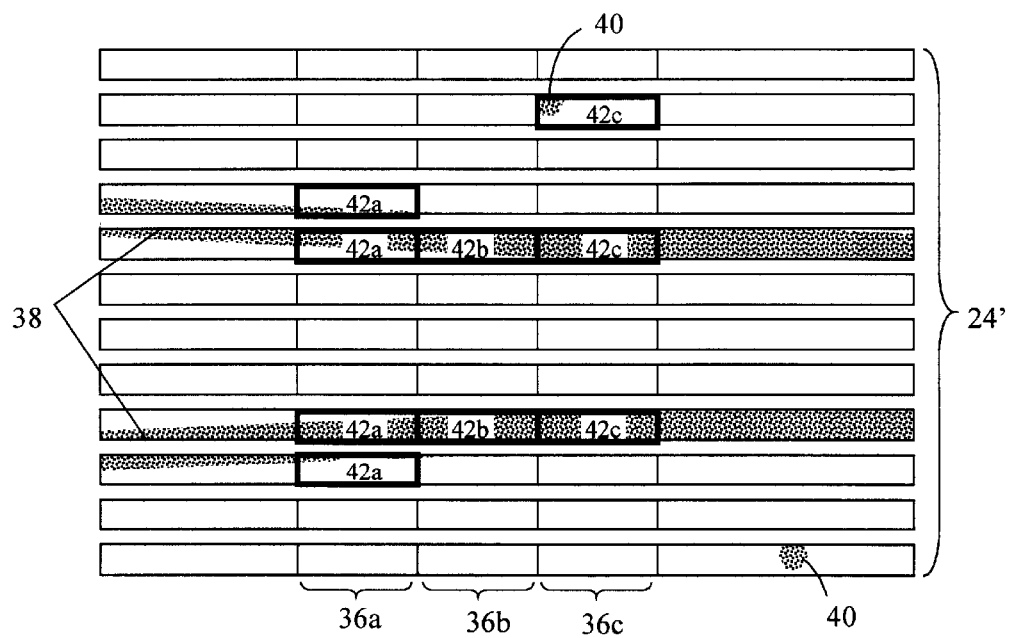
FIG. 6 shows errors caused by media defects and their correction by transverse ECC code words in accordance with the present invention.

FIG. 6 illustrates errors caused by media defects and their correction by transverse ECC code words in accordance with the present invention. Transverse ECC code words 36a–c are recorded on a band of longitudinal data tracks 24'. The recorded tracks are affected by media scratches, 38, and small point defects 40. The scratches are disposed in a predominantly longitudinal direction because the medium is scanned in a direction parallel to the tracks. Where the media defects intersect the recorded symbols of code words 36a–c, the reproduced data may include errors 42a–c which include defective data symbols in code words 36a–c, respectively. If the data tracks are adjacent, even a small longitudinal scratch may cause more than one symbol error in a given code word, as is seen in code word 36a where scratches straddle two data tracks.

Consider two narrow scratches that each cause data errors on two adjacent data tracks, as is the case in FIG. 6 in the vicinity of ECC code word 36a. If the ECC code word includes just one symbol on each track, then the scratches will require detection and correction of 4 symbol errors. If the ECC code word includes two symbols per track, detection and correction of 8 symbol errors is required. Either of these cases can be accommodated if for example the ECC code word implements an RS code with sufficient parity. However, if the ECC code word includes three or more symbols per track, correction of at least 12 symbol errors is required. The error correction requirement in this case is well beyond the capability of real-time ECC decoders, especially if error correction margin is required for other types of media imperfections, such as random point defects, large spot defects, or wider scratches. For this reason, transverse ECC code words should be recorded with no more than two symbols per data track. Note that dispersing the symbols of a transverse ECC code word in the longitudinal direction does not provide greater immunity to scratch-induced errors in a linear recording system with scratches that are parallel to the data tracks.

Transverse ECC code words are suitable for correction of data errors arising from one or more longitudinal scratches, even in the presence of other random media defects. Transverse ECC code words are similarly suitable for correction of data errors arising from faulty recording or readout transducers, which create similar longitudinal error patterns. The error correction capability of transverse ECC code words may be further increased by implementing the transverse ECC code words as the inner code words or outer code words of a product code ECC system.

Figure 7:
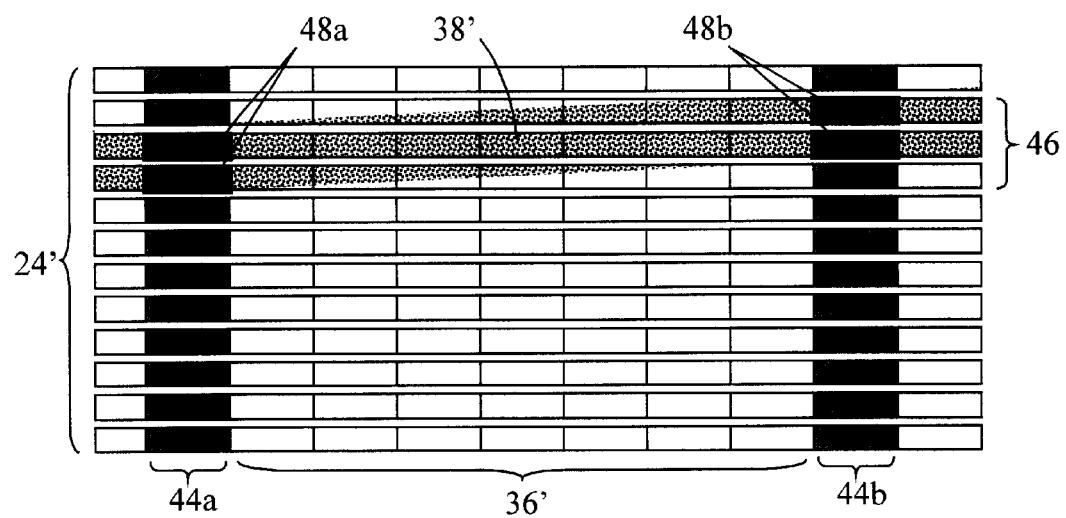
FIG. 7 illustrates scratch detection fields for erasure correction in accordance with the present invention.

FIG. 7 illustrates scratch detection fields for erasure correction in accordance with the present invention. A block of transverse ECC code word symbols 36' is recorded on a band of longitudinal data tracks 24'. Scratch detection fields 44a and 44b are recorded on either end of the block. Each scratch detection field includes one scratch detection symbol on each of the data tracks. The symbols of each scratch detection field are disposed in a line that crosses the band of data tracks. In the presence of a longitudinal scratch, 38', defective symbols in scratch detection fields 44a and 44b may be quickly and reliably detected. Defective scratch detection symbols are denoted by 48a and 48b in FIG. 7. Scratch detection occurs when a positional coincidence is found between defective symbols in consecutive scratch detection fields. The sections of data tracks connecting such defective scratch detection symbols are then flagged as suspect scratch locations. All transverse ECC code word symbols disposed on flagged data track segments may then be processed by erasure correction. Scratch detection fields are provided at a minimum spatial frequency such that each transverse ECC code word symbol is bracketed by scratch detection symbols on the same data track and a plurality of ECC code word symbols are recorded between consecutive scratch detection symbols on the same data track. Thus scratch detection fields increase the error correcting capability of transverse ECC code words by permitting highly efficient erasure correction of data errors due to media scratches and similar defects.

An additional feature of scratch detection fields is that if the longitudinal spacing between consecutive scratch detection fields is small enough, they may serve to detect and erase large spot defects as well as longitudinal scratches.

Scratch detection fields may include fixed-pattern scratch detection symbols. Defects in such symbols may be detected immediately by direct comparison. Alternatively, a scratch detection field may be a code word that includes some user data with enough parity for reliable error detection.

Fixed-pattern scratch detection symbols may serve a dual purpose for channel synchronization. The scratch detection symbol patterns for synchronization are chosen to be readily recognized by a positional coincidence circuit. Each such scratch detection symbol provides an opportunity to correct the phase or synchronization of the data clock associated with readout of the corresponding data track.

The invention has been described in detail with particular reference to certain preferred embodiments thereof, but it will be understood that variations and modifications can be effected within the spirit and scope of the invention.

PARTS LIST

| | |
|---|---|
| 10 | data symbols |
| 10' | data symbols |
| 12 | parity symbols |
| 12' | parity symbols |
| 14 | inner code parity |
| 16 | outer code parity |
| 18 | inner code word |
| 20 | outer code word |
| 22 | logical ECC block |
| 24 | data track |
| 24a | data track |
| 24b | defective data track |
| 24c | data track |
| 24d | data track |
| 24' | longitudinal data tracks |
| 26 | first data symbol mapping |
| 26' | second data symbol mapping |
| 28 | error burst |
| 30 | defective data symbols |
| 32 | data scanning direction |
| 34 | transducers array |
| 36 | transverse ECC code words |
| 36' | transverse ECC code word symbols |
| 36a–c | transverse ECC code words |
| 38 | media scratches |
| 40 | point defect |
| 42a | defective data symbols in ECC code word 36a |
| 42b | defective data symbols in ECC code word 36a |
| 42c | defective data symbols in ECC code word 36a |
| 44a–b | ECC scratch detection fields |
| 46 | erased tracks |
| 48a | defective symbols in scratch detection field 44a |
| 48b | defective symbols in scratch detection field 44b |

What is claimed is:

1. An error correction method for multi-track data recording and read out of recorded multi-track digital data, comprising the steps of:

a) organizing input digital data into a sequence of data words;

b) encoding each data word as a fixed-length transverse error correcting code word having a fixed number of symbols which represent digital data and parity;

c) recording each transverse error correcting code word onto a plurality of longitudinal data tracks on a recording medium with no more than two code symbols from each code word recorded on each track;

d) reading recorded transverse error correcting code words by a plurality of readout transducers, with at least one transducer for each data track, that reproduce the code word symbols of each transverse error correcting code word from the plurality of longitudinal data tracks; and e) processing the transverse error correcting code words to recover the data words and identify and correct symbol errors caused by media defects or transducer failures by using the error correcting parity.

2. The method of claim 1 wherein the transverse code word is a Reed-Solomon code word.

3. The method of claim 1 wherein at least two of the longitudinal data tracks are disposed adjacent to one another.

4. The method of claim 1 further comprising:

f) recording scratch-detection fields interspersed among the recorded transverse error correcting code words at a minimum spatial frequency of one scratch-detection symbol for a plurality of recorded error correcting symbols, each scratch detection field including a symbol on each of the plurality of longitudinal data tracks;

g) reading the scratch-detection fields by the plurality of readout transducers;

h) processing the scratch-detection fields to identify scratch detection symbol errors;

i) comparing the location of symbol errors on consecutive scratch-detection fields to flag data track segments that may be affected by scratches or transducer failures; and j) performing erasure-mode error correction on the transverse error correcting code word symbols that are disposed on the flagged data track segments.

5. The method of claim 4 in which some symbols of the scratch-detection words are fixed synchronization patterns and the processing of scratch-detection words includes synchronization of the readout channels.

6. The method of claim 1 in which the transverse error correcting code words are the inner code words of a product code error correcting.

7. The method of claim 1 in which the transverse error correcting code words are the outer code words of a product code error correcting.

8. The method of claim 1 further including counting the number of symbols errors in the transverse error correcting code words and using such counts to make an immediate decision of whether to rewrite the current data block before recording of the subsequent data block.

* * * * *